United States Patent
Qiao

(10) Patent No.: US 11,733,582 B2
(45) Date of Patent: Aug. 22, 2023

(54) VARIABLE OPTICAL FILTER

(71) Applicant: GC Photonics Inc., Nepean (CA)

(72) Inventor: Lijie Qiao, Nepean (CA)

(73) Assignee: GC Photonics, Inc., Ottawa (CA)

( * ) Notice: Subject to any disclaimer, the term of this patent is extended or adjusted under 35 U.S.C. 154(b) by 107 days.

(21) Appl. No.: 16/967,712

(22) PCT Filed: Mar. 15, 2018

(86) PCT No.: PCT/CA2018/050316
§ 371 (c)(1),
(2) Date: Aug. 5, 2020

(87) PCT Pub. No.: WO2019/148264
PCT Pub. Date: Aug. 8, 2019

(65) Prior Publication Data
US 2021/0041760 A1    Feb. 11, 2021

Related U.S. Application Data

(60) Provisional application No. 62/626,293, filed on Feb. 5, 2018.

(51) Int. Cl.
*G02F 1/035* (2006.01)
*G02F 1/225* (2006.01)
*G02F 1/21* (2006.01)
*G02B 6/293* (2006.01)

(52) U.S. Cl.
CPC .......... *G02F 1/225* (2013.01); *G02B 6/29355* (2013.01); *G02F 1/212* (2021.01); *G02F 2203/055* (2013.01)

(58) Field of Classification Search
CPC .... G02F 1/225; G02F 1/212; G02F 2203/055; G02F 1/0147; G02B 6/29355; H05B 1/023
USPC .......................... 385/1–4, 27, 41–42, 45–46
See application file for complete search history.

(56) References Cited

U.S. PATENT DOCUMENTS

| | | | |
|---|---|---|---|
| 5,033,016 A * | 7/1991 | Falk | G06E 1/065 708/191 |
| 6,407,846 B1 * | 6/2002 | Myers | H04B 10/505 359/239 |
| 6,724,957 B2 | 4/2004 | Saida et al. | 385/27 |
| 7,239,763 B2 * | 7/2007 | Kawanishi | G02F 1/3136 385/39 |
| 8,270,780 B2 * | 9/2012 | Kawanishi | G02F 1/3137 385/9 |
| 2010/0046065 A1 | 2/2010 | Little et al. | 359/337.1 |

(Continued)

OTHER PUBLICATIONS

PCT/CA2018/050316 Search Report dated Nov. 29, 2018.

*Primary Examiner* — Kaveh C Kianni
*Assistant Examiner* — Hung Q Lam
(74) *Attorney, Agent, or Firm* — Teitelbaum & Bouevitch; Neil Teitelbaum

(57) ABSTRACT

A tunable optical filter includes sequentially coupled Mach-Zehnder (MZ) interferometers. The first and last interferometers are configured to function as variable power splitter/combiner, whereas the middle interferometer or interferometers have unequal optical paths, creating a desired spectral response of the entire filter. The amplitude of the spectral response can be varied by varying the optical power splitting/combining ratios.

5 Claims, 15 Drawing Sheets

(56) References Cited

U.S. PATENT DOCUMENTS

2015/0234252 A1* 8/2015 Sugiyama ............... G02F 1/035
  385/2
2016/0094017 A1 3/2016 Larson ..................... H01S 5/50

\* cited by examiner

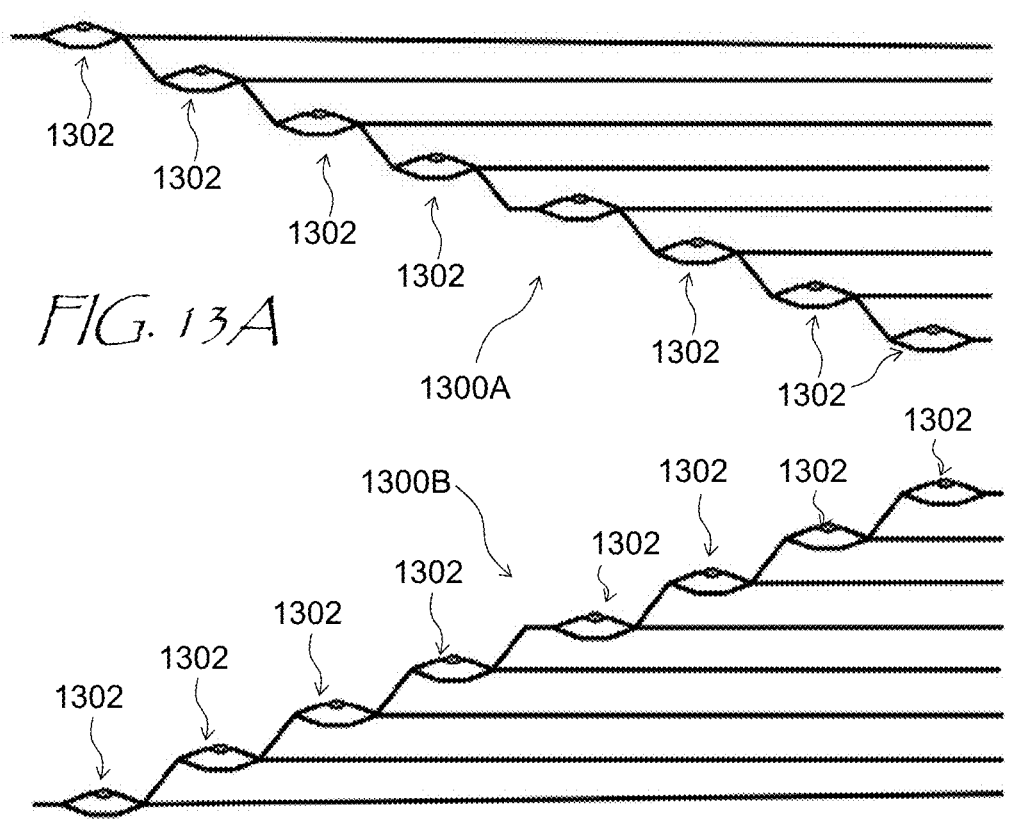

VARIABLE OPTICAL FILTER

RELATED APPLICATION DATA

This application is the national stage entry of International Application No. PCT/CA2018/050316 filed Mar. 15, 2018, which claims priority to U.S. provisional application No. 62/626,293 filed Feb. 5, 2018. The entireties of these applications are hereby incorporated by reference.

FIELD

The present application is related to optical components and modules, and in particular to devices and methods for optical filtering.

BACKGROUND

Variable optical filters are filters whose spectral characteristics can be tuned in a controllable fashion. Variable optical filters can be used for selecting a desired wavelength of light while rejecting or attenuating light at other wavelengths, to detect light at a particular wavelength, to control spectral performance of a light source, etc. Variable optical filters can also be used in optical amplifiers to provide a desired spectral gain profile of an optical amplifier.

Many optical amplifiers exhibit spectral gain that varies with time, temperature, and amplifier load. To offset an undesired spectral gain change of an optical amplifier, a special type of a variable optical filter, called dynamic gain equalizer, can be used. A spectral loss profile of the dynamic gain equalizer can be freely controlled to offset an undesired spectral gain change of an optical amplifier.

One drawback of dynamic gain equalizers is complexity and associated high cost. An optical fiber link may include many optical amplifiers, and including a dynamic gain equalizer for each optical amplifier, in each link, may become prohibitively expensive.

SUMMARY

One aspect of the present disclosure includes an inexpensive alternative to a dynamic gain equalizer of the prior art. A simple variable optical filter may be used to offset a gain profile change of an optical amplifier under a known variation of an external or internal parameter. For greater flexibility, the variable optical filter may be coupled to a filter component having a fixed transmission spectrum, such that in combination, these two filters match a desired optical loss spectrum, which may be varied due to the presence of the variable optical filter in the filter combination.

In accordance with an embodiment of the present disclosure, there is provided a variable optical filter comprising a first Mach-Zehnder (MZ) interferometer comprising first and second path waveguides, and a first phase adjuster coupled to the first path waveguide for adjusting a first optical path length difference between the first and second path waveguides. A second MZ interferometer is optically coupled to the first MZ interferometer by a common first 2×2 coupler, the second MZ interferometer comprising third and fourth path waveguides having different optical path lengths. A third MZ interferometer is optically coupled to the second MZ interferometer by a common second 2×2 coupler, the third MZ interferometer comprising fifth and sixth path waveguides, and a second phase adjuster coupled to the fifth path waveguide for adjusting a second optical path length difference between the fifth and sixth path waveguides.

When the first optical path length difference is adjusted by the first phase adjuster, an optical power splitting ratio between the third and fourth path waveguides varies, whereby a transmission characteristic of the variable optical filter varies. A third phase adjuster may be coupled to the third path waveguide for adjusting a third optical path length difference between the third and fourth path waveguides of the second MZ interferometer.

In an embodiment, the first and second path waveguides have a substantially equal optical path length, and the fifth and sixth path waveguides have a substantially equal optical path length. The second phase adjuster may be configured to adjust the second optical path length difference to be substantially equal to the first optical path length difference. The 2×2 optical couplers may be e.g. evanescent 2×2 optical couplers. A non-variable optical filter component may be coupled to the first or third MZ interferometer to provide a pre-defined initial transmission spectrum of the variable optical filter. Further, a controller may be provided to control the tunable optical filter e.g. by tuning the first and second optical path length differences.

In accordance with an embodiment of the present disclosure, there is further provided a method for varying a spectral characteristic of light. The method includes sequentially propagating the light through a first MZ interferometer comprising first and second path waveguides; a second MZ interferometer optically coupled to the first MZ interferometer by a common first 2×2 coupler and comprising third and fourth path waveguides of different optical path lengths; and a third MZ interferometer optically coupled to the second MZ interferometer by a common second 2×2 coupler and comprising fifth and sixth path waveguides. The first optical path length difference between the first and second path waveguides may be adjusted to vary an optical power splitting ratio between the third and fourth path waveguides.

In accordance with an embodiment of the present disclosure, there is provided a variable optical filter comprising a tunable optical splitter comprising an input waveguide and n output waveguides. The tunable optical splitter is configured for controllable power-splitting of an input optical signal between the n output waveguides. A tunable optical combiner comprising n input waveguides and an output waveguide is provided for controllable power-combining of split optical signals at the n input waveguides of the tunable optical combiner into an output optical signal in the output waveguide of the tunable optical combiner. At least one Mach-MZ interferometer is optically coupled between an output waveguide of the n output waveguides of the tunable optical splitter and an input waveguide of the n input waveguides of the tunable optical combiner. The at least one MZ interferometer comprises a pair of path waveguides having different optical path lengths. One, e.g. the $n^{th}$ output waveguide, of the tunable optical splitter may be directly coupled to one, e.g. the $n^{th}$ input waveguide, of the tunable optical combiner. Further, a controller may be provided to control the tunable optical filter e.g. by tuning the power splitting/combining.

In accordance with an embodiment of the present disclosure, there is further provided a method for varying a spectral characteristic of light. The method may include sequentially propagating the light through the tunable optical splitter, at least one MZ interferometer optically coupled to an output waveguide of the n output waveguides of the tunable optical splitter, and the tunable optical combiner as described above. The method further includes adjusting a parameter such as power-splitting of the light between the n output waveguides of the tunable optical splitter, thereby varying the spectral characteristic of the light.

In accordance with an embodiment of the present disclosure, there is further provided an optical amplifier comprising the variable optical filter and an optical gain medium optically coupled to the variable optical filter, wherein the controller is configured to adjust the optical power splitting ratio such as to offset a variation of a spectral characteristic of the optical gain medium. In one embodiment, the optical amplifier comprises a variable optical attenuator (VOA) optically coupled to the gain medium, and the controller is further configured to vary attenuation of the VOA to adjust an overall gain of the optical amplifier, and to adjust the optical power splitting ratio of the variable optical filter such as to offset a spectral gain variation of the gain medium resulting from the adjusted overall gain of the optical amplifier.

These and other aspects of the present disclosure will become apparent to one skilled in the art upon reading the following description of the preferred embodiments and the corresponding diagrams and descriptions in support of the stated claims. To those skilled in the art, it will be evident that the embodiments described herein may be varied to meet particular specialized requirements without departing from the spirit and scope of the present disclosure. These embodiments are therefore not to be taken as indicative of the limits of the invention but rather as exemplary structures described to illustrate and explain various aspects of the invention.

BRIEF DESCRIPTION OF THE DRAWINGS

Exemplary embodiments will now be described in conjunction with drawings, in which:

FIGS. 13A and 13B are schematic diagrams of alternative embodiments of the 1×n splitter;

DETAILED DESCRIPTION OF THE PREFERRED EMBODIMENTS

Figure 1:
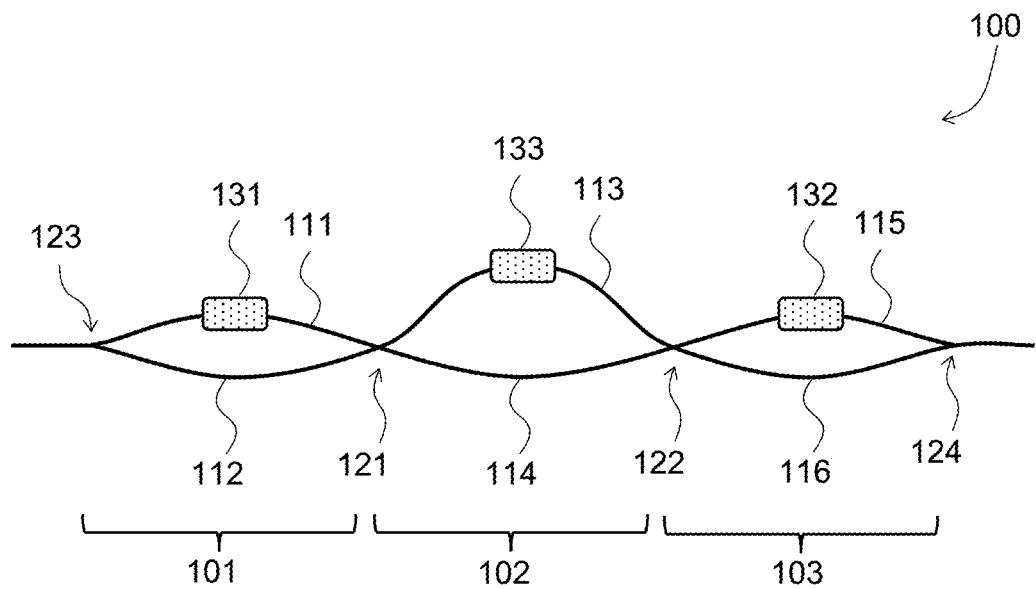
FIG. 1 is a schematic diagram of a variable optical filter of the present disclosure including three cascaded MZ interferometers.

Referring to FIG. 1, a variable optical filter 100 of the present disclosure includes a first Mach-Zehnder (MZ) interferometer 101 optically coupled to a second MZ interferometer 102, which is optically coupled to a third MZ interferometer 103. The first MZ interferometer 101 of the chain of MZ interferometers has first 111 and second 112 path waveguides, the second MZ interferometer 102 has third 113 and fourth 114 path waveguides having different optical path lengths, and the third MZ interferometer 103 has fifth 115 and sixth 116 path waveguides. The first 101 and second 102 MZ interferometers are optically coupled by a common first 2×2 optical coupler 121. The second 102 and third 103 MZ interferometers are optically coupled by a common second 2×2 optical coupler 122. The first 121 or second 122 2×2 optical couplers may include 2×2 evanescent optical couplers, multimode interference couplers, etc. Input 123 and output 124 couplers, e.g. Y-couplers or 2×2 couplers, may be provided for inputting and outputting light, respectively, from the variable optical filter 100. The input coupler 123 may form an integral part of the first MA interferometer 201, and the output coupler 204 may form an integral part of the third MZ interferometer 103.

A first phase adjuster 131 may be coupled to the first path waveguide 111 of the variable optical filter 100 for adjusting a first optical path length difference between the first 121 and second 122 path waveguides of the first MZ interferometer 101. A second phase adjuster 132 may be coupled to the fifth path waveguide 115 for adjusting a second optical path length difference between the fifth 115 and sixth 116 path waveguides of the third MZ interferometer 103. A third phase adjuster 133 may also be provided in some embodiments. The third phase adjuster 133 is coupled to the third path waveguide 113 for adjusting a third optical path length difference between the third 113 and fourth 114 path waveguides of the second MZ interferometer 102. By way of a non-limiting example, the first 131, second 132, and third 133 phase adjusters may be implemented as resistive heaters coupled to respective waveguides for selective heating of the respective waveguides, thereby varying optical path length of these waveguides. The waveguides 101 to 106 may be made of silica, polymer, etc., supported by a suitable substrate, such as a silicon substrate. In some embodiments, the second 112, fourth 114, and sixth 116 path waveguides may also include phase adjusters.

Figure 2:
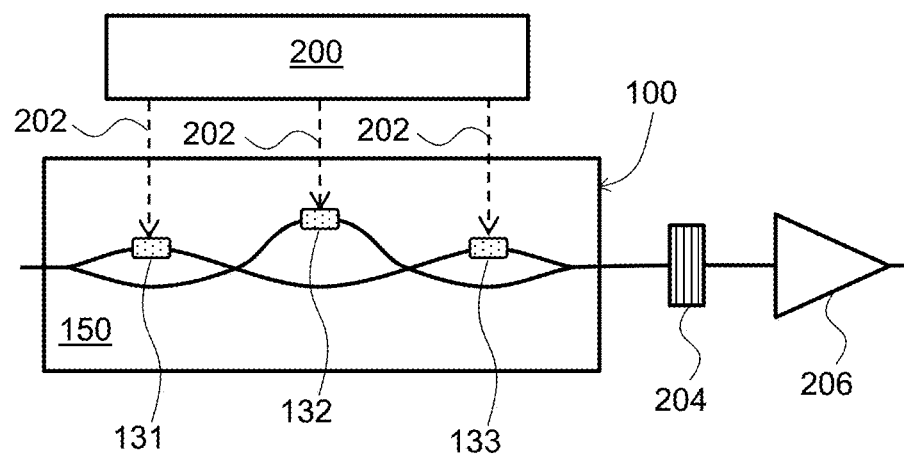
FIG. 2 is a schematic diagram of the variable optical filter of FIG. 1 including a controller and a fixed optical filter component coupled to an optical gain medium.

Referring to FIG. 2, a controller 200 may be coupled to the variable optical filter 100 by control lines 202 for driving the phase adjusters 131 to 133. A non-variable optical filter component 204, e.g. a thin-film interference filter, may be coupled to the output coupler 124 of the third MZ interferometer 103. An optical gain medium 206 may be coupled to the non-variable optical filter component 204. The filters 100 and 204 may be coupled to the gain medium 206 in any order. In FIG. 2, waveguides of the variable optical filter 100 are supported by a substrate 150.

Figure 3A:
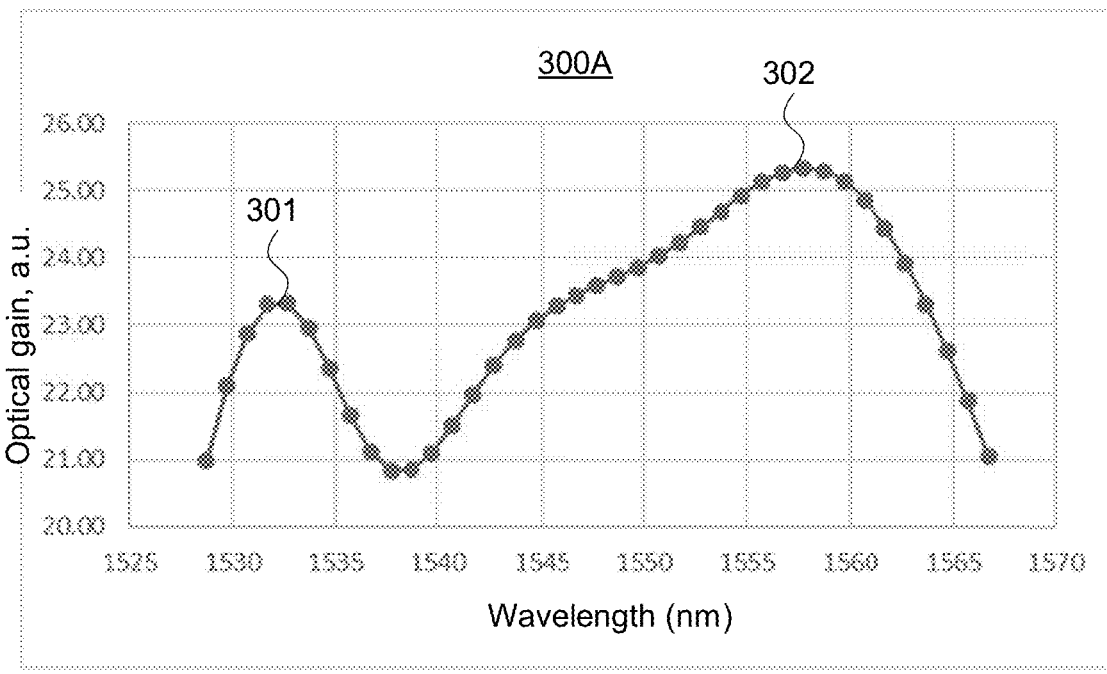
FIG. 3A is a gain profile of the gain medium of FIG. 2 at a nominal temperature.
Figure 3B:
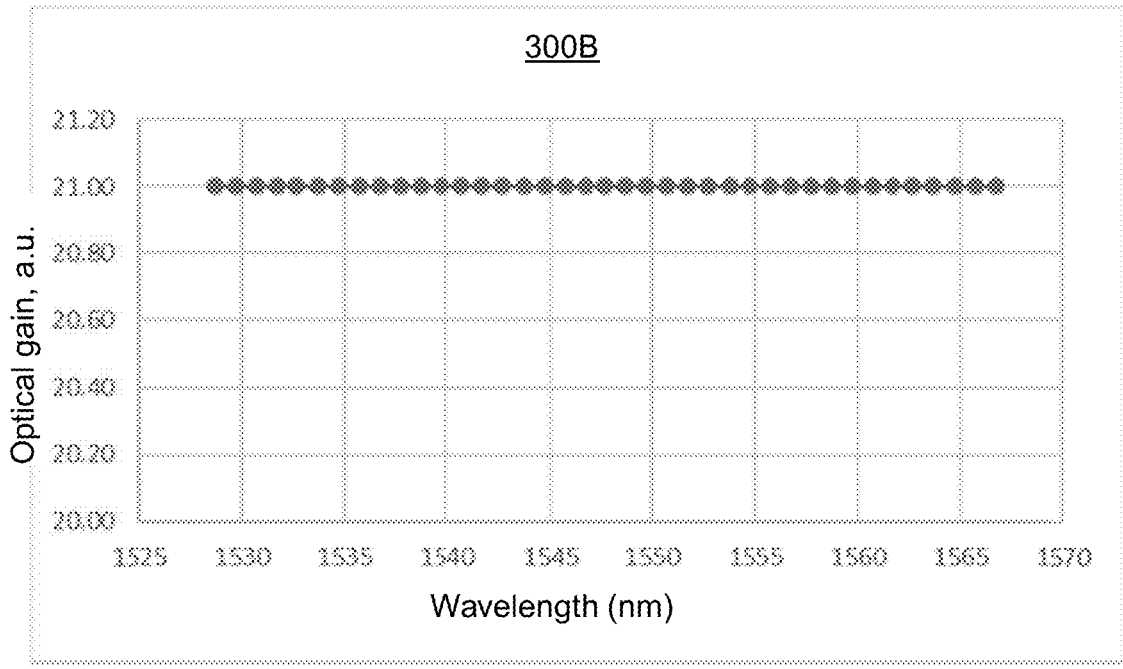
FIG. 3B is a gain profile of the gain medium coupled to the fixed optical filter of FIG. 2, at the nominal temperature.

Operation of the variable optical filter 100 will now be described. Referring to FIGS. 3A and 3B with further reference to FIG. 2, the optical gain medium 206 (FIG. 2) may include an erbium-doped fiber (EDF) which, when pumped with pump light, has a spectral gain profile 300A (FIG. 3A). The spectral gain profile 300A has undesirable gain peaks 301 and 302 at 1532 nm and 1557 nm, respectively. The non-variable optical filter component 204 has a transmission spectrum inverse of the gain profile 300A, such that an overall gain profile 300B shown in FIG. 3B is substantially flat. In other words, the purpose of the non-variable optical filter component 204, suitably termed a "gain-flattening filter", is to make the optical gain substantially the same at any wavelength of incoming light between 1527 nm and 1567 nm.

Figure 4A:
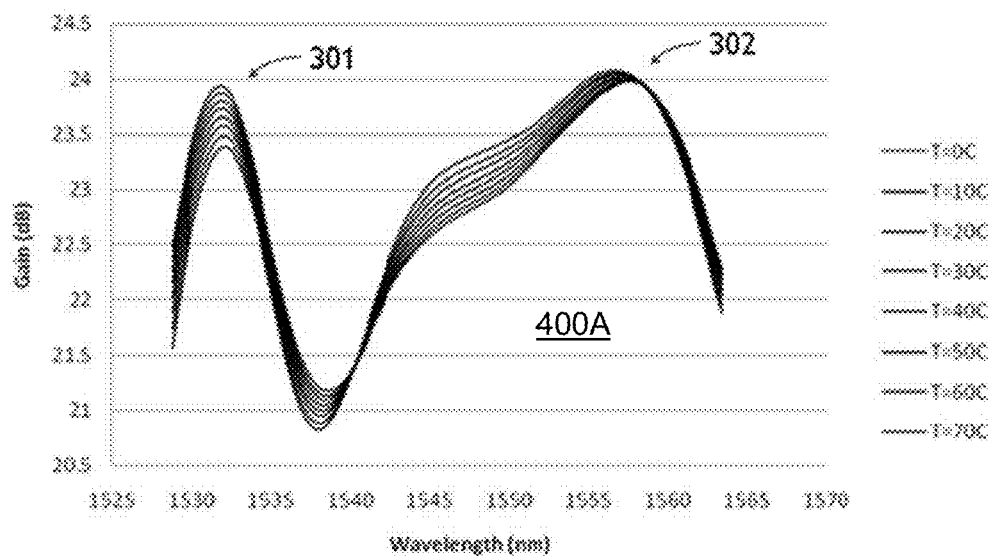
FIG. 4A is a gain profile of the gain medium of FIG. 2 at a varying temperature.

The gain profile of the EDF gain medium 206 generally depends on temperature; therefore, the gain profile 300B is only flattened by the non-variable gain-flattening filter 204 at one nominal temperature. Referring to FIG. 4A, optical gain profiles 400A correspond to the temperature of an erbium-doped fiber amplifier (EDFA) varying from 0 C to 70 C. One can see that, as the temperature varies, the peaks 301 and 302 vary in amplitude and center wavelength. When the fixed optical filter component 206 is coupled to the EDF gain medium 206, an overall gain profile 400B of FIG. 4B develops a temperature-dependent U-shaped spectral gain tilt shown in FIG. 4B.

Figure 4B:
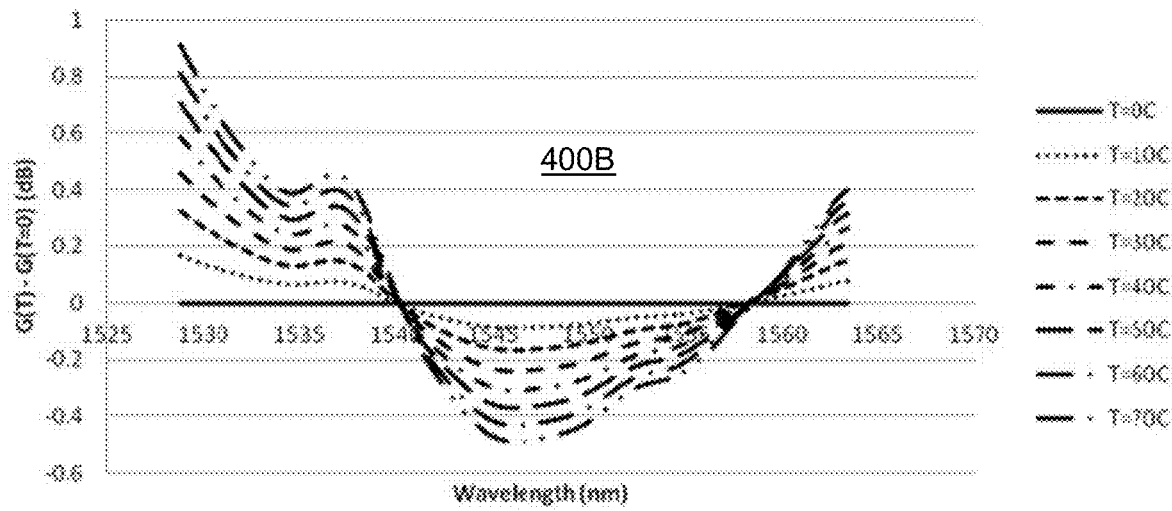
FIG. 4B is a gain profile of the gain medium coupled to the fixed optical filter of FIG. 2, at the varying temperature.
Figure 5:
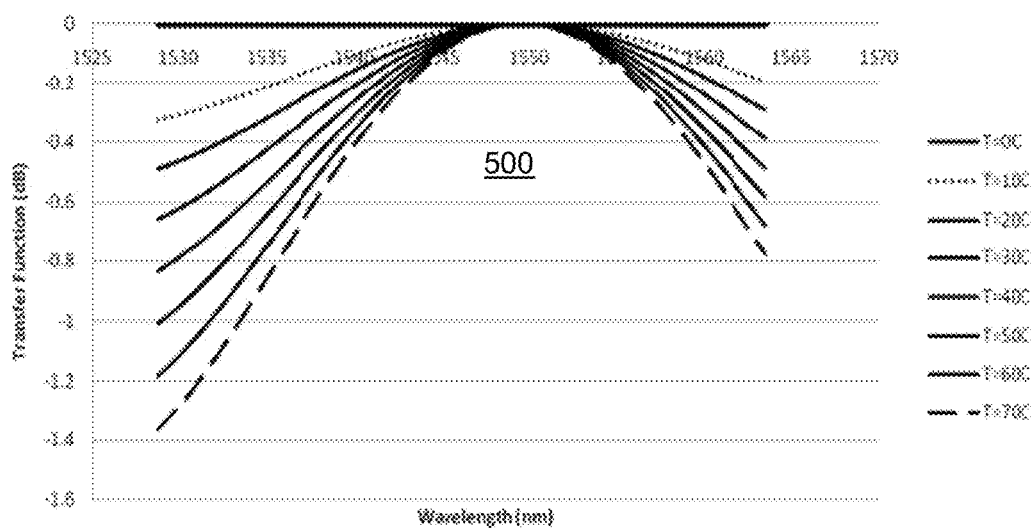
FIG. 5 is a transmission spectrum of the variable optical filter of FIG. 1 selected to offset the temperature-varying gain profile of FIG. 4B.

Referring now to FIG. 5, an optical transmission spectrum 500 of the variable optical filter 100 has a shape which is approximately inverse to the U-shape of the overall gain profile 400B of FIG. 4B. When the variable optical filter 100 is combined with the fixed optical filter component 206, their attenuations add, i.e.

$$Att(\lambda,T)=Att(\lambda,T_0)+\Delta Att(\lambda,T-T_0) \quad (1)$$

allowing the overall gain variation of the EDF gain medium 206 with temperature to be reduced by varying an amplitude of the optical transmission spectrum 500. The amplitude is varied by tuning the variable optical filter 100 by the controller 200 to produce inverted U-shapes of different amplitudes, as shown in FIG. 5.

Figure 6:
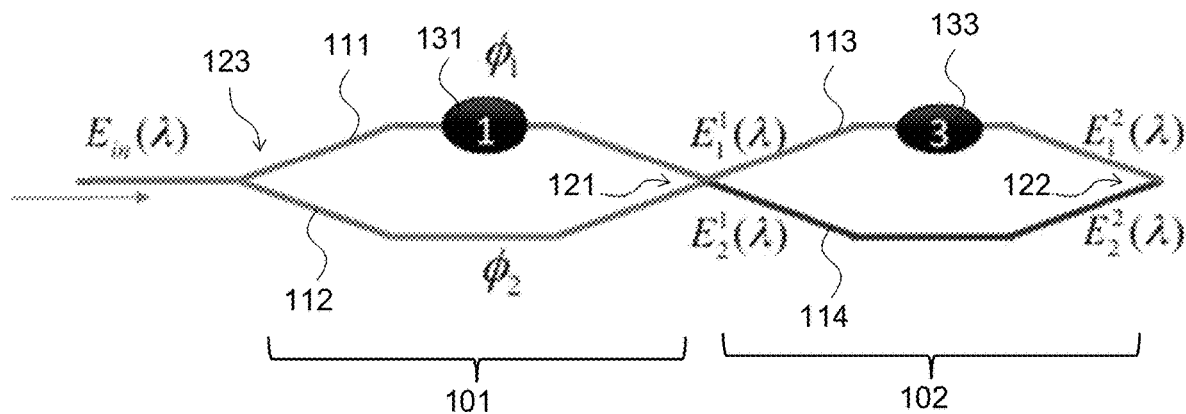
FIG. 6 is a schematic diagram of a portion of the variable optical filter of FIG. 1, illustrating how the spectral performance of FIG. 5 can be achieved.

The tuning of the variable optical filter 100 of FIG. 1 to provide a variable-amplitude inverted spectral U-shape will now be described. In FIG. 6, the first 101 and second 102 MZ interferometers of the variable optical filter 100 are reproduced for convenience. An incoming light beam of an amplitude $E_{in}$ is split, e.g. equally split, by the input coupler 123 into two beams, one propagating in the first path waveguide 111 and the other propagating in the second path waveguide 112. At the first 2×2 optical coupler 121, these two beams will undergo optical interference, resulting in redistribution of amplitudes $E_1$ and $E_2$ of these two beams. The amplitude redistribution depends on a relative phase of these two beams $\Delta\phi^1$. The redistributed amplitudes $E^1_1(\lambda)$ and $E^1_2(\lambda)$, where $\lambda$ is wavelength, can be expressed as $$E^1_1(\lambda, T) = r_1 E_{in}(\lambda) \quad (2)$$
$$E^1_2(\lambda, T) = r_2 E_{in}(\lambda)$$

where $$r_1(\lambda, T) = \sin\left(\frac{\Delta\varphi^1}{2}\right) \quad (3)$$
$$r_2(\lambda, T) = \cos\left(\frac{\Delta\varphi^1}{2}\right)$$

In Eq. (3), T is temperature, and $\Delta\phi^1$ is the phase difference created in the first MZ interferometer 101. In case of the phase adjuster 131 implemented as a resistive heater, the phase difference can be defined as $$\Delta\phi^1 = k_n \Delta T^1 \quad (4)$$

where $k_n$ is a thermal phase coefficient of the first path waveguide 111, and $\Delta T^1$ is temperature difference created by the first phase adjuster 131. When the optical path lengths of the first 111 and second 112 path waveguides are the same, the resulting amplitude coefficients $r_1$ and $r_2$ are substantially wavelength independent. Thus, the first phase adjuster 131 can adjust or tune a power splitting ratio $R_1/R_2=(r_1/r_2)^2$ of optical beams traveling in the third 113 and fourth 114 path waveguides, in a wavelength-independent manner. In other words, the first MZ interferometer 101 operates as a variable, wavelength-independent beamsplitter for the second MZ interferometer 102.

The operation of the second MZ interferometer 102 will now be considered. The third 113 and fourth 114 path waveguides of the second MZ interferometer 102 have different optical path lengths, and two optical beams traveling in the third 113 and fourth 114 path waveguides will generally have different phase delay at the second 2×2 coupler 122, resulting in a wavelength-dependent, periodic spectral characteristic of the second MZ interferometer 102. The amplitude of this periodic wavelength dependence depends on the optical power splitting ratio $R_1/R_2$ provided by the first MZ interferometer 101. After the second 2×2 coupler 122, the beams will have secondary amplitudes $E^2_1(\lambda)$ and $E^2_2(\lambda)$, which can be written down as $$E^1_1(\lambda, T) = r_1 \exp\left[i\left(\frac{2\pi n_1^2 L_1^2}{\lambda}\right)\right] E_{in}(\lambda) \quad (5)$$
$$E^2_2(\lambda, T) = r_2 \exp\left[i\left(\frac{2\pi n_2^2 L_2^2}{\lambda}\right)\right] E_{in}(\lambda)$$

where $n_1$, $L_1$ and $n_2$, $L_2$ are refractive index and length, respectively, of the third 113 and fourth 114 path waveguides, respectively. The amplitude distribution of Eq. (5) defines the variable amplitude of the wavelength dependence, i.e. the transmission characteristic, of the variable optical filter 100. The optical power splitting ratio $R_1/R_2$ between the third 113 and fourth 114 path waveguides varies when the first optical path length difference is adjusted by the first phase adjuster 131, whereby a transmission characteristic of the variable optical filter 100 is adjusted.

The purpose and function of the third MZ interferometer 103 (FIG. 1) will now be considered. When the first MZ interferometer 101 provides a non-zero power splitting ratio to the second MZ interferometer 102, the optical power is present in both arms of the second MZ interferometer, i.e. in the third 113 and fourth 114 path waveguides, which would result in an extra optical loss if the output waveguide were to be directly connected to the second 2×2 coupler, that is, if only two MZ interferometers 101 and 102 were used. The function of the third MZ interferometer 103 is to reduce or eliminate the extra optical loss. The second phase adjuster 132 of the third MZ interferometer 103 can be operated by the controller 200 to adjust the second optical path length difference of the third MZ interferometer 103 to be substantially equal to the first optical path length difference (of the first MZ interferometer 101. When the phase differences are equal, the third MZ interferometer 103 "undoes" or "reverts" the power splitting introduced by the first MZ interferometer 101, thus reducing overall insertion loss of the tunable optical filter 100. To further reduce an undesired wavelength dependence of the power splitting and, or combining, the first 111 and second 112 path waveguides may have a substantially equal optical path length, and the fifth 115 and sixth 116 path waveguides may also a substantially equal optical path length.

The third phase adjuster 133 may be operated by the controller 200 to compensate or adjust for temperature-varying optical path difference in the second MZ interferometer 102, or more generally to vary the optical path difference to provide a desired wavelength shift of the spectral response of the second MZ interferometer 102, as may be required. In an embodiment, the objective of controlling the phase shifters 131, 132, and 133 is to offset a drift of a spectral characteristic of the optical gain medium 206 coupled to the variable optical filter 100, so as to lessen a drift of the gain profile of the optical gain medium 206, however caused. This can result in a more stable operation of an optical amplifier employing the gain medium 206.

When the second phase adjuster 132 adjusts the second optical path length difference to be substantially equal to the first optical path length difference to undo the optical power splitting as explained above, the overall transfer function of the variable optical filter 100 becomes $$T_r(\lambda,T) = R_1^2 + R_2^2 + R_1 R_2 2 \cos(\Delta\phi^2) \quad (6A)$$

where $\Delta\phi^2$ is the optical path difference in the second MZ interferometer 102; equivalently, the output optical power $P_{out}(\lambda,T)$ can be written down as $$P_{out}(\lambda,T) = [R_1^2 + R_1^2 + 2R_2 \cos(\Delta\phi)] P_{in}(\lambda) \quad (6B)$$

where $P_{in}(\lambda)$ is a wavelength-dependent optical power of an input optical signal, and $R_1 = r_1^2$, $R_2 = r_2^2$ of Eq. (3) above.

The variable optical filter 100 may be implemented in a variety of geometries, depending on spectral characteristics of gain media being stabilized. For EDFA implementations, an optical path length difference between the third 113 and fourth 114 path waveguides of the second MZ interferometer 102 can be e.g. at least 50 micrometers, whereas the optical path length differences for the first 101 and third 103 MZ interferometers can be e.g. less than 1 micrometer. In one embodiment, the first phase adjuster 131 is configured to adjust the optical power splitting ratio in a range between 0 and 1. Furthermore in an embodiment, the tunable optical filter 100 is made polarization-independent by configuring the first 101 to third 103 MZ interferometers to operate in both polarizations of light. Alternatively, a polarization diversity scheme may be used.

Figure 7A:
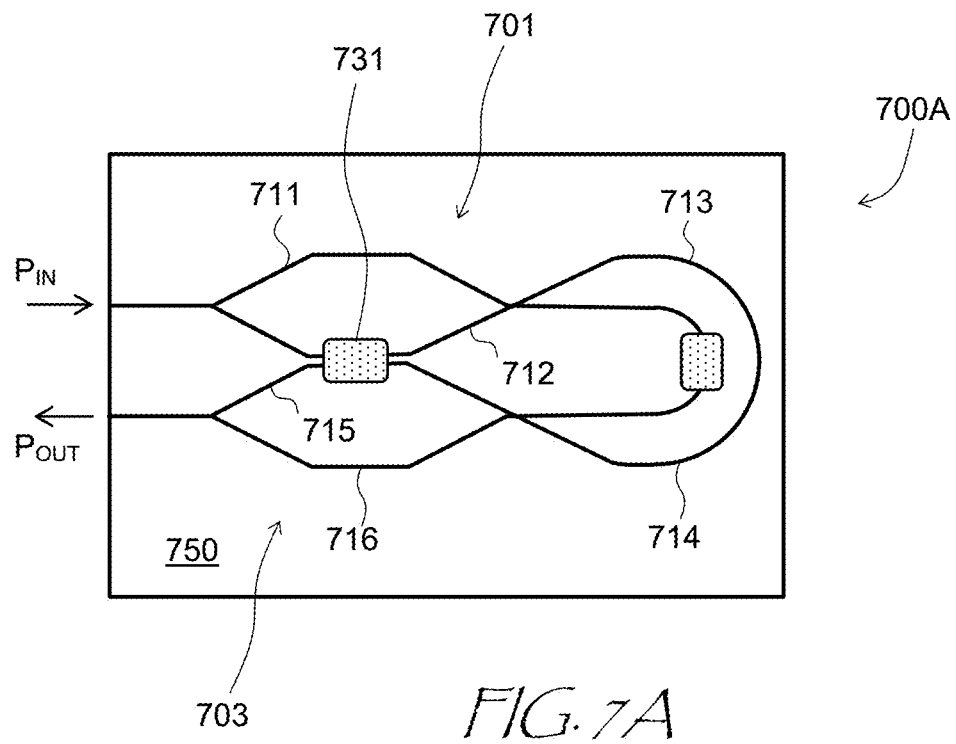
FIG. 7A is a schematic diagram of a folded embodiment of a variable optical filter of the present disclosure.

Referring now to FIG. 7A, a tunable optical filter 700A is a folded variant of the tunable optical filter 100 of FIG. 1. In the tunable optical filter 700A of FIG. 7A, path waveguides 713 and 714 of a second MZ interferometer 702 are folded or turned by 180 degrees, such that first 701 and third 703 MZ interferometers are disposed next to each other on a substrate 750. This allows for overall size reduction of the tunable optical filter 700, as well as enables the first 701 and third 703 MZ interferometers to share a same phase adjuster 734. In this configuration, the first optical path length difference, i.e. the difference between first 711 and second 712 path waveguides, is always substantially same as the second optical path length difference, i.e. the difference between fifth 715 and sixth 716 path waveguides, further simplifying the construction and operation of the tunable optical filter 700A.

Figure 7B:
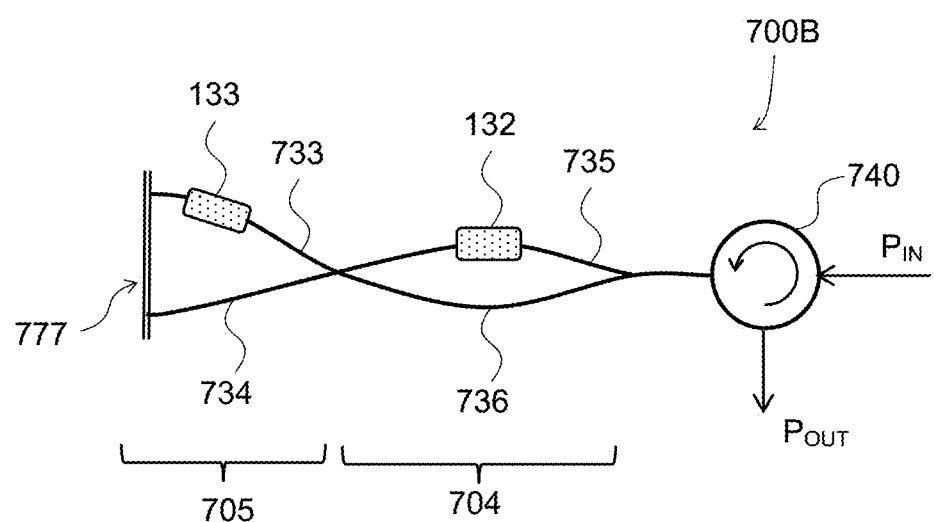
FIG. 7B is a schematic diagram of a reflective, double-pass embodiment of the variable optical filter of FIG. 1.

Turning to FIG. 7B, tunable optical filter 700B is a reflective variant of the tunable optical filter 100 of FIG. 1. In the tunable optical filter 700B of FIG. 7B, a single double-pass MZ interferometer 704 is provided instead of the first 101 and third 103 interferometers of the variable optical filter 100. The double-pass MZ interferometer 704 may include a pair of path waveguides 735 and 735, and at least one phase adjuster 132. A reflective second MZ interferometer 705 is provided instead of the second interferometer 102 operating in transmission. The reflective second MZ interferometer 705 comprises third 733 and fourth 734 path waveguides, at least one phase adjuster 133, and a mirror 777 for reflecting light propagating in the third 733 and fourth 734 path waveguides. The mirror 777 causes the light to propagate back through the third 733 and fourth 734 path waveguides, respectively. The variable optical filter 700B further includes an optical circulator 740, which is optically coupled to the double-pass MZ interferometer 704 for separating the input light $P_1$ coupled to the double-pass MZ interferometer 704 and output light $P_{out}$ coupled from the double-pass MZ interferometer 704. The operation of the tunable optical filter 700B of FIG. 7B is similar to the operation of the tunable optical filter 100 of FIG. 1. The mirror 777 may be disposed e.g. at an edge of a substrate supporting the waveguides of the tunable optical filter 700B. One advantage of the tunable optical filter 700B of FIG. 7B is a more compact size. The optical circulator 740 may be replaced with a directional coupler, not shown.

Figure 8A:
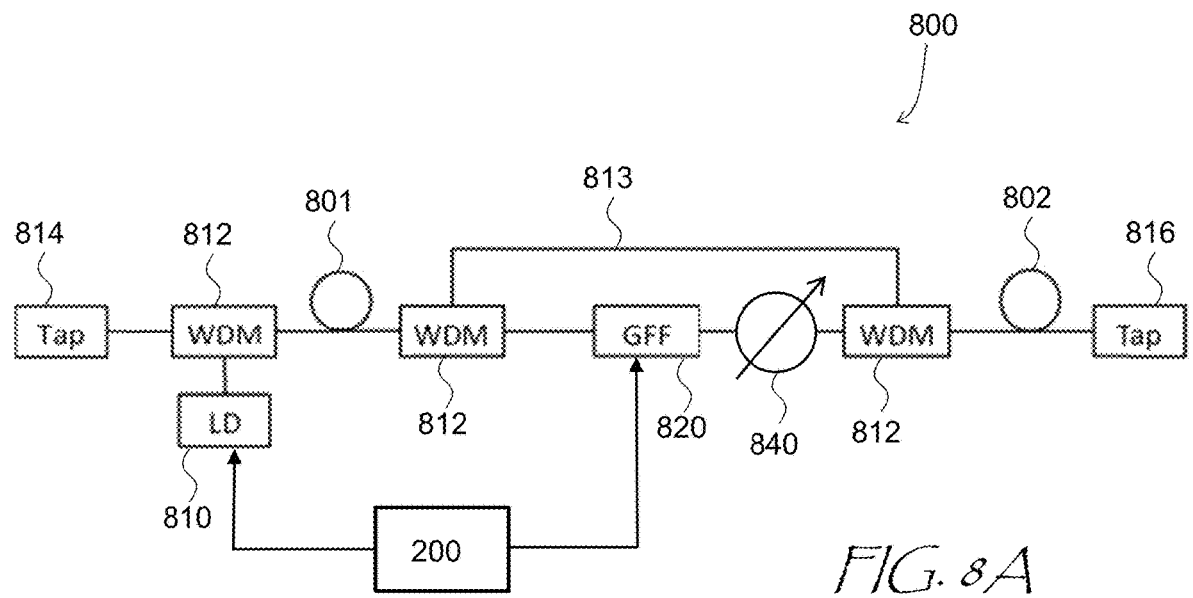
FIG. 8A is a schematic diagram of a two-stage optical amplifier of the present disclosure.

Referring to FIG. 8A, a two-stage optical amplifier 800 of the present disclosure includes first 801 and second 802 gain fiber spans pumped by a pump laser diode (LD) 810 through wavelength division multiplexers (WDM) 812 and a fiber link 813. The gain fiber spans 801 and 802 form a gain medium of the two-stage optical amplifier 800. A gain flattening filter (GFF) 820 includes the tunable optical filter 100 having the fixed optical filter component 204 (FIG. 2). A controller 880 can be configured, e.g. programmed, to adjust the optical power splitting ratio of the first MZ interferometer 101 of the variable optical filter 100 (FIG. 1), so as to offset a drift of a spectral characteristic of the gain fiber spans 801 and 802 (FIG. 8A). Input 814 and output 816 optical taps may be provided for diagnostics and control purposes, such as measuring input and output optical power levels, detecting wavelength channels, etc. Many other configurations of an optical amplifier may be used, as known to a person of ordinary skill in the art.

Figure 8B:
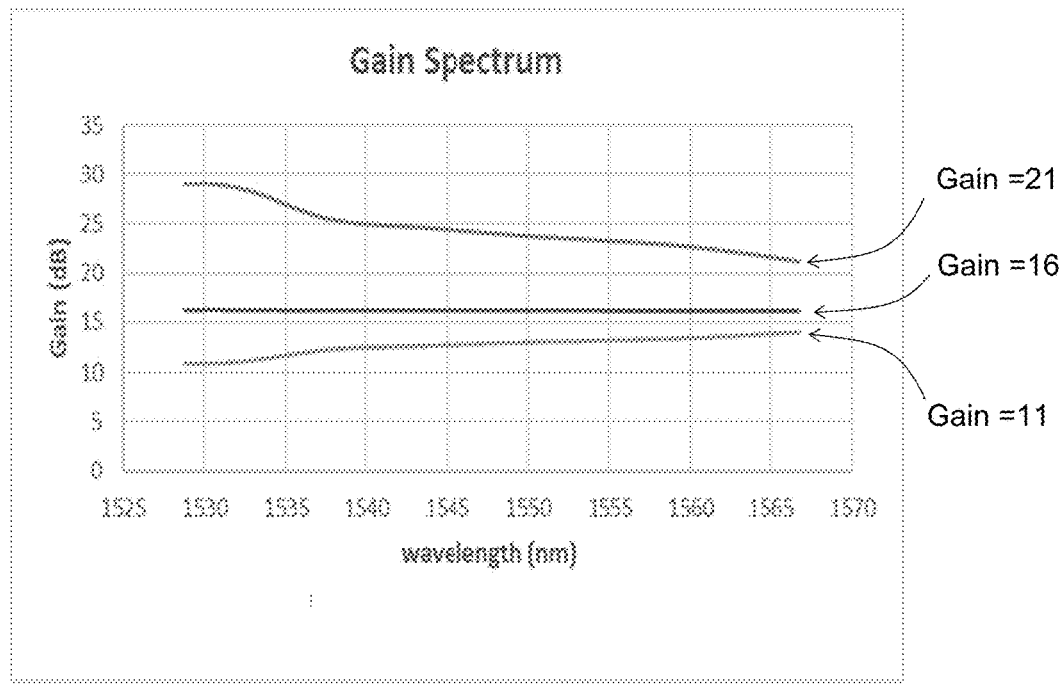
FIG. 8B is a gain profile of the two-stage optical amplifier of FIG. 8A at different gain levels, before applying a corresponding correction by the variable optical filter.

In the embodiment shown, the optical amplifier 800 further includes an optional variable optical attenuator (VOA) 840 optically coupled to the gain fiber spans 801,802 e.g. by one of the WDMs 812. The controller 880 can be further configured to vary attenuation of the VOA 840 to adjust an overall gain of the optical amplifier 800, according to the formula $$G_{effective} = G_{max} - \text{Att} \tag{7}$$

where $G_{effective}$ is an effective overall gain, $G_{max}$ is a maximum set gain, and $\text{Att}_{VOA}$ is the attenuation of the VOA 840. As the gain is varied, a gain tilt may re-appear, as shown in FIG. 8B for three overall gain values of 11, 16, and 21. To offset this gain tilt resulting from the varied overall gain of the optical amplifier 800, the controller 880 can be further configured to adjust the optical power splitting ratio of the variable optical filter in the GFF 820 such as to compensate the gain tilt, or another spectral gain variation due to the changed overall optical gain. Other spectral gain variation of the gain medium, e.g. the one resulting from amplifier load variation, may also be compensated to a certain degree. Folded 700A and reflective 700B embodiments of the variable optical filter may also be used in the optical amplifier 800 of FIG. 8A, e.g. as a part of the GFF 820.

Figure 9:
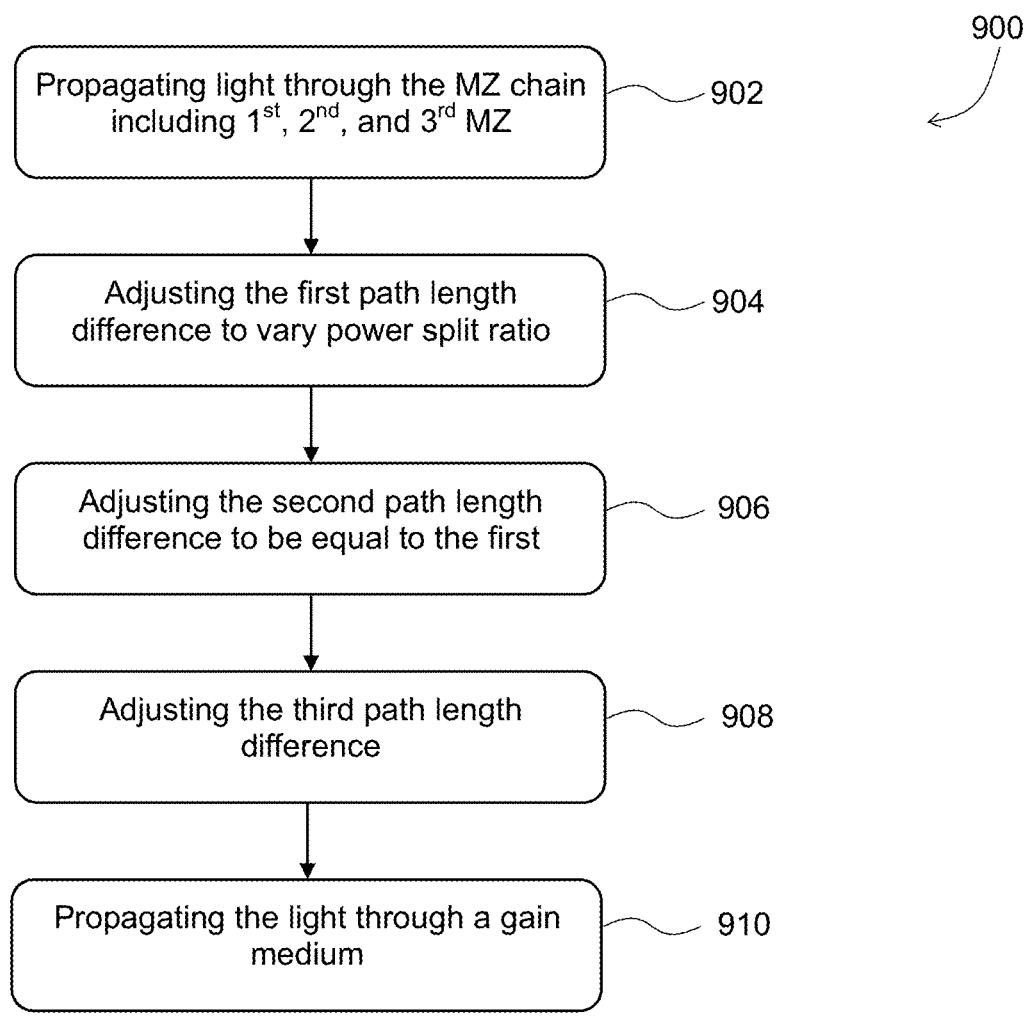
FIG. 9 is a flow chart of a method for varying a spectral characteristic of light according to the disclosure.

Turning to FIG. 9, a method 900 for varying a spectral characteristic of light includes a step 902 of sequentially propagating the light through the first MZ interferometer 101; the second MZ interferometer 102; and the third MZ interferometer 103 of the tunable optical filter 100. In step 904, the first optical path length difference between the first 111 and second 112 path waveguides is adjusted, so as to vary the optical power splitting ratio $P_1/P_2$ between the third 113 and fourth 114 path waveguides, as explained above. In one embodiment, the second optical path length difference is adjusted in step 906 to be substantially equal to the first optical path length difference, to undo the optical power splitting introduced by the first MZ interferometer 101, thus reducing optical loss of the tunable optical filter 100. In step 908, the third optical path length difference between the third 113 and fourth 114 path waveguides may also be adjusted to achieve required spectral performance, for example to keep the optical path length difference between the third 113 and fourth 114 path waveguides constant as the temperature of the second MZ interferometer 102 varies. In step 910, the light may be propagated (before or after propagating through the tunable optical filter 100) through an optical gain medium, e.g. the gain medium 206 (FIG. 2), and the first optical path length difference may be adjusted to offset a drift of the spectral characteristic, such as gain tilt, of the optical gain medium. Optionally, a change of an overall gain setting introduced e.g. by the VOA 840 in the optical amplifier 800, may also be corrected.

Figure 10:
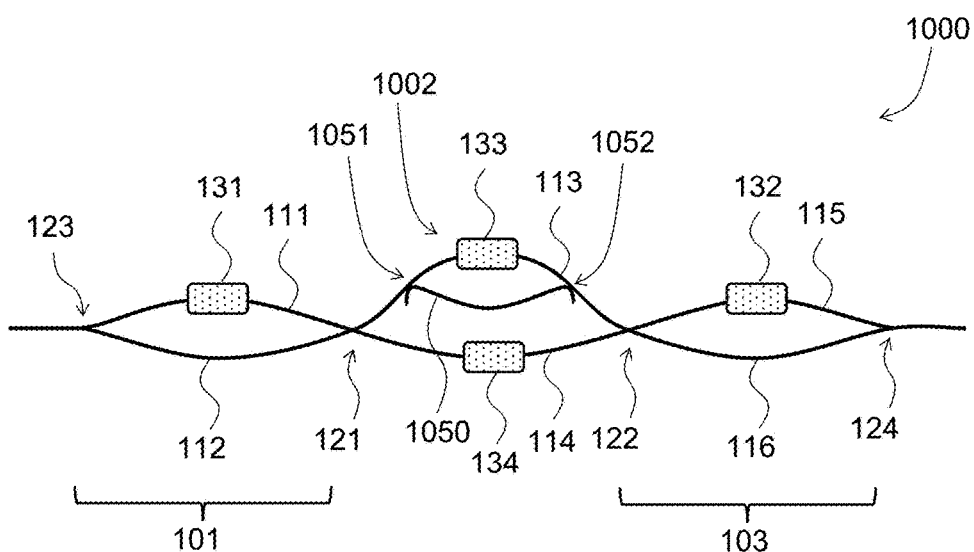
FIG. 10 is a schematic diagram of a variable optical filter of the present disclosure, including three cascaded MZ interferometers of FIG. 1 and a parallel waveguide branch coupled to the middle MZ interferometer of the cascade.

Referring now to FIG. 10, a variable optical filter 1000 is similar to the variable optical filter 100 of FIG. 1, and includes similar elements. The variable optical filter 1000 further comprises a linking waveguide 1050 coupled to the third path waveguide 113 via a pair of couplers 1051 and 1052, forming a center MZ interferometer 1002. The center MZ interferometer 1002 is preferably unbalanced, i.e. has waveguides of unequal optical path length, to provide a wavelength-varying spectral response, as explained above. The fourth path waveguide 114 forms a waveguide branch running parallel to the unbalanced center MZ interferometer 1002. An additional phase adjuster 134 may be provided for the fourth path waveguide 114.

The variable optical filter 1000 functions similarly to the variable optical filter 100 of FIG. 1. The first MZ interferometer 101 operates as a variable optical splitter between two paths, one path including the center MZ interferometer 1002, which provides the wavelength-varying spectral response, and the other path including the parallel branch having a flat spectral response. The resulting spectral response can be similar to that one shown in FIG. 5; however, it is also dependent on an optical path length difference between the path including the center MZ interferometer 1002, and the path including the fourth path waveguide 114. The additional phase adjuster 134 (FIG. 10) may be used to adjust that path, e.g. to be equal to the path through the center MZ interferometer 1002. Like in the variable optical filter 100 of FIG. 1, the third MZ interferometer 103 functions as an optical combiner, combining light propagated through the center MZ interferometer 1002 and light propagated through the four math waveguide 114. The overall transmission function of the variable optical filter 1000 may be represented as $$T_r^E(v) = R_1 + R_2 \cos(F_0 v + \phi) \tag{8}$$

where $R_1$ and $R_2$ are splitting coefficients for the two paths, $F_0$ is a constant, v is an optical frequency, and $\phi$ is the phase difference controlled by the third phase adjuster 133.

Figure 11A:
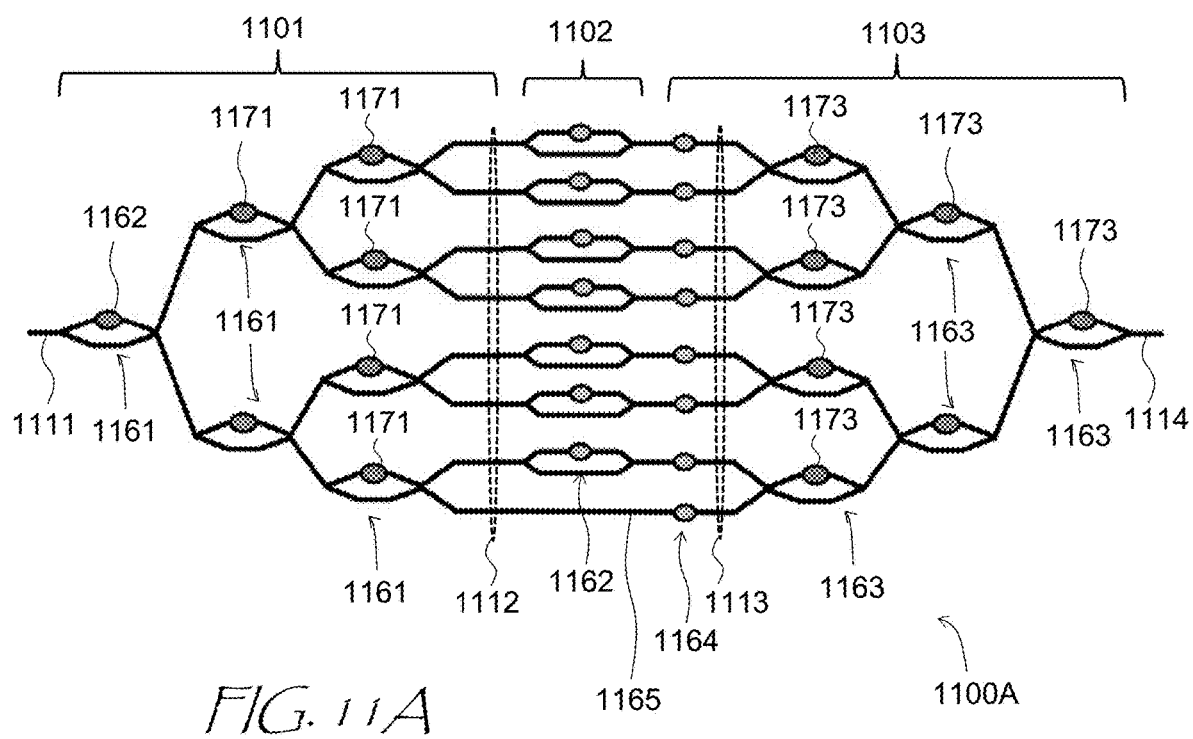
FIG. 11A is a schematic diagram of a more generic embodiment of the variable optical filter of FIG. 10, including a 1×n splitter, a n×1 combiner, and a plurality of parallel MZ interferometers.

Turning to FIG. 11A, a variable optical filter 1100A represents a generalization of the variable optical filter 1000 of FIG. 10. The variable optical filter 1100A of FIG. 11A includes not one but a plurality of middle MZ interferometers 1102 and a tunable optical splitter 1101 having an input waveguide 1111 and n output waveguides 1112, for controllable power-splitting of an input optical signal between the n output waveguides 1112. In FIG. 11, the number n is equal to eight, although more generally, n can be any integer $\geq 2$, and, in principle, is only limited by a useful area on a semiconductor wafer. A tunable optical combiner 1103 has n input waveguides 1113 and an output waveguide 1114, for controllable power-combining of split optical signals at the n input waveguides 1113 of the tunable optical combiner 1103 into an output optical signal in the output waveguide 1114 of the tunable optical combiner 1103. In the embodiment shown, the tunable optical splitter 1101 is implemented as a binary tree of splitter MZ interferometers 1161 each having a pair of splitter path waveguides and a phase adjuster 1171 coupled to at least one of the splitter path waveguides for adjusting an optical path length difference between the splitter path waveguides, as explained above. In a similar manner, the tunable optical combiner 1103 is implemented as a binary tree of combiner MZ interferometers 1163 each having a pair of splitter path waveguides and a phase adjuster 1173 coupled to at least one of the combiner path waveguides for adjusting an optical path length difference between the combiner path waveguides. Other types of tunable splitters and combiners may be used to provide controllable power-splitting of an input optical signal between the n output waveguides 1112 of the tunable optical splitter 1101, and to provide controllable power-combining of the split optical signals at the n input waveguides 1113 of the tunable optical combiner 1103 into an output optical signal.

The center MZ interferometers 1102 are optically coupled between output waveguides of the n output waveguides 1112 of the tunable optical splitter 1111, and input waveguides of the n input waveguides 1113 of the tunable optical combiner 1103. Herein, the term "center" is only meant as an identifier, i.e. the MZ interferometers do not have to be disposed in a geometrical center of the structure. Each MZ interferometer 1102 may include a pair of path waveguides having different optical path lengths, to provide a wavelength-varying spectral response. The MZ interferometers 1102 can be made tunable by providing corresponding phase adjusters 1162 as shown. At least one tunable MZ interferometer may be provided, which, as explained above, results in an adjustable spectral characteristic. In the embodiment shown, seven MZ interferometers 1102 are provided, and the last output waveguide 1112 of the tunable optical splitter 1101 is directly coupled to the last input waveguide 1113 of the tunable optical combiner 1103. In the example shown, n=8, and seven, that is, n−1, MZ interferometers 1102 are provided. The eighth remaining output 1112 and input 1113 waveguides are coupled together by a waveguide section 1165. One can see that the tunable optical filter 1000 of FIG. 10 is equivalent to the tunable optical filter 1100A of FIG. 11A at n=2.

To provide appropriate phase relationship between output optical signals being combined, n phase adjusters 1164 can each be coupled to a particular one of the n input waveguide 1113 of the tunable optical combiner 1103, for adjusting relative optical phase of light propagating in the n output waveguides 1113 for combining into the output waveguide 1114. The n phase adjusters 1164 can also be coupled to the n output waveguide 1112 of the tunable optical splitter 1101. The waveguide section 1165 may also have the corresponding phase adjuster 1164. The power splitting/combining ratios determine the overall transmission spectrum of the tunable optical filter 1100A, which is defined by the transmission spectra of individual MZ interferometers 1102. The phase adjusters 1171, 1162, 1164, and 1173 may be e.g. resistive heaters changing the refractive index of underlying waveguides via thermo-optic effect.

Figure 11B:
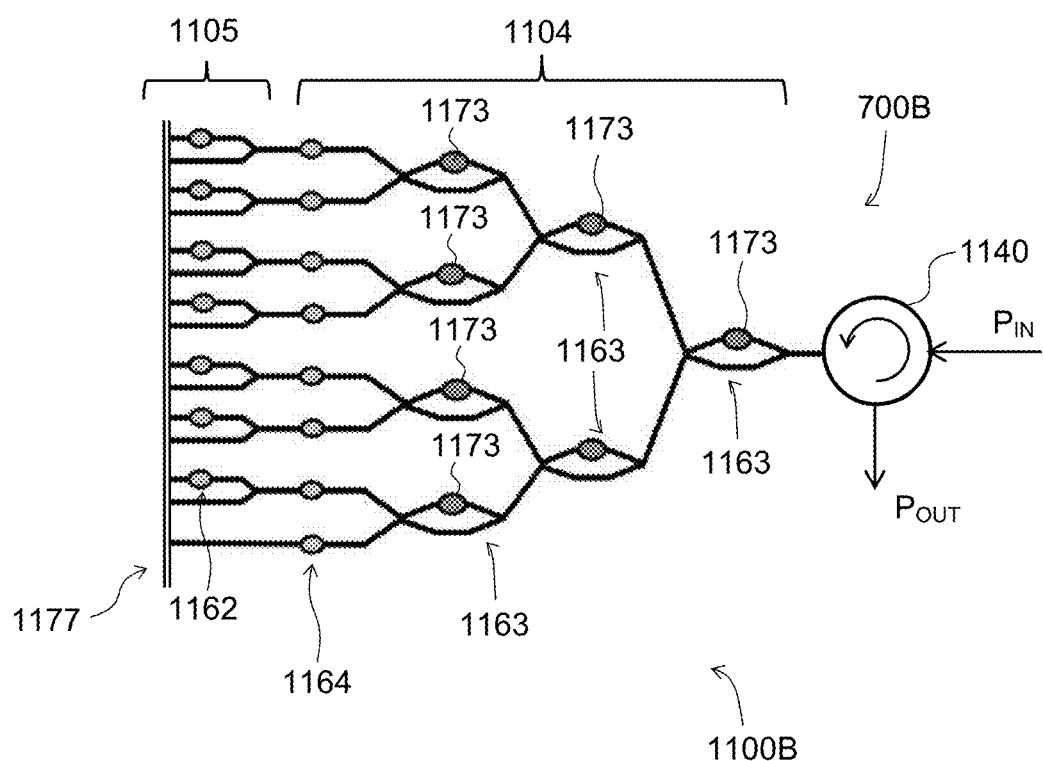
FIG. 11B is a schematic diagram of a reflective, double-pass embodiment of the variable optical filter of FIG. 11A.

Referring to FIG. 11B, a variable optical filter 1100B is a reflective, double-pass variant of the variable optical filter 1100A of FIG. 11A. In the variable optical filter 1100B of FIG. 11B, a double-pass 1×n optical coupler 1104 is used in place of both a tunable optical splitter and a tunable optical combiner. In the embodiment shown, the double-pass 1×n optical coupler 1104 includes the MZ interferometers 1163 arranged in a binary tree manner and having the phase adjusters 1173. Reflective MZ interferometers 1105 are optically coupled to the double-pass 1×n optical coupler 1104. The reflective MZ interferometers 1105 include the phase adjusters 1162. The reflective MZ interferometers 1105 further include a common mirror 1177 for reflecting light propagating in the path waveguides to propagate back through the same respective path waveguides. At least one reflective MZ interferometer 1105 can be provided. The reflective double-pass variable optical filter 1100B may further include an optical circulator 1140 optically coupled to the double-pass 1×n optical coupler 1104 for separating input light $P_{in}$ coupled to the double-pass 1×n optical coupler 1104 and output light $P_{out}$ coupled from the double-pass 1×n optical coupler. The optical circulator 740 may be replaced with a directional coupler, not shown. The operation of the reflective double-pass variable optical filter 1100B is similar to the operation of the variable optical filter 1100A of FIG. 11A. Furthermore, the variable optical filters 1100A and 1100B can be used in the optical amplifier 800 of FIG. 8A, e.g. as a part of the GFF 820.

Figure 12A:
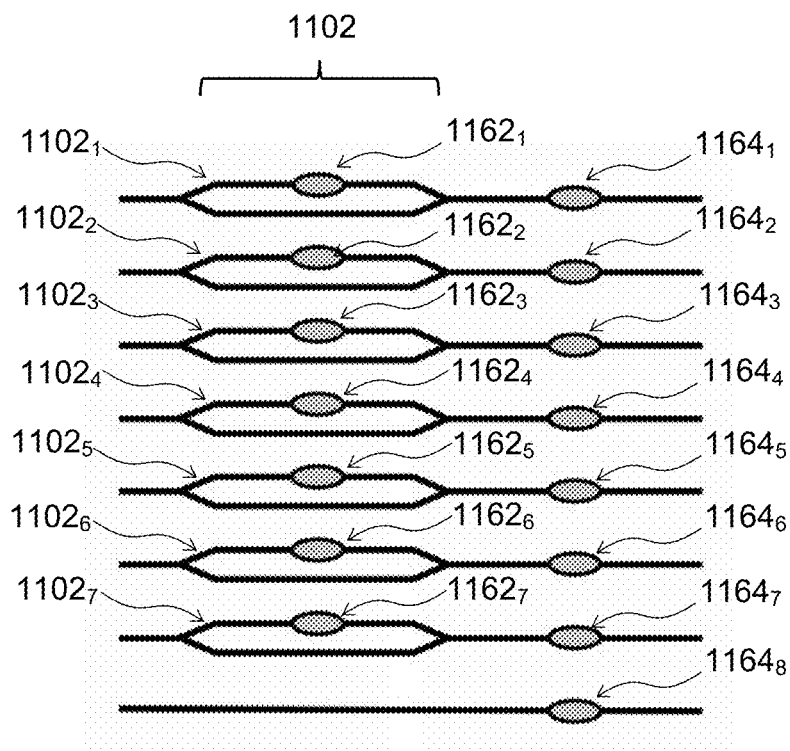
FIG. 12A is a schematic diagram of the plurality of parallel MZ interferometers of FIG. 11.
Figure 12B:
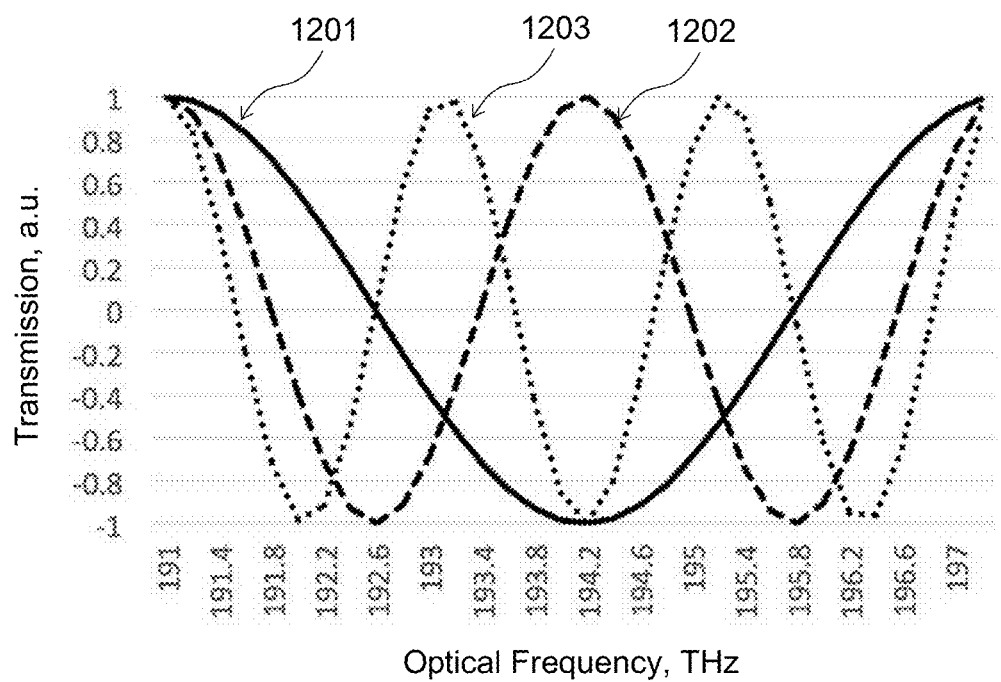
FIG. 12B is a transmission spectral plot of three individual MZ interferometers of FIG. 12A.

Referring now to FIG. 12A, the plurality of MZ interferometers $1102_1$-$1102_7$ each including the phase adjusters $1162_1$-$1162_7$, and the phase adjusters $1164_1$-$1164_7$, are shown separately for clarity. The waveguide section 1165 has the phase adjuster $1164_8$. In an embodiment, each one of the plurality of MZ interferometers 1102 has a different period of optical frequency dependence of transmission, referred to herein as a free spectral range (FSR). By way of a non-limiting example, FIG. 12B illustrates spectral responses of the first three MZ interferometers 1102. The first MZ interferometer $1102_1$ has a transmission spectrum 1201 having the FSR of 6 THz, the second MZ interferometer $1102_2$ has a spectral response 1202 having the FSR of 3 THz, and the third MZ interferometer $1102_3$ has a spectral response 1203 having the FSR of 1.5 THz. In this example, the FSRs of the MZ interferometers $1102_1$, $1102_2$, and $1102_3$ are in a binary relationship with respect to each other. The phases of the spectral responses of the MZ interferometers $1102_1$-$1102_7$, having a binary relationship of the respective FSRs, can be individually tuned by adjusting phase by the corresponding phase adjusters 1162 and 1164. The desired spectral response of the tunable optical filter 1100A can then be obtained by obtaining a Fourier series for the desired response, including amplitudes and phases of individual Fourier components. The amplitudes and phases of the individual Fourier components of the series determine corresponding optical power splitting ratios by the tunable optical splitter 1101, the optical power combining ratios by the tunable optical combiner 1103, and corresponding phases of the spectral responses of the individual MZ interferometers $1102_1$-$1102_7$. At least two MZ interferometers having the binary FSR relationship, i.e. the first FSR is twice larger than the second FSR, may be provided. The resulting spectral response of the tunable optical filter 1100A can be represented as $$Tr(v) = \sum_{j=1}^{n} R_j \cos[(j-1)F_0 v + \phi_j] \qquad (9)$$

where $R_j$ are splitting coefficients for the individual MZ paths, $F_0$ is a constant, v is the optical frequency, and $\phi_j$ are phase differences controlled by the corresponding phase adjusters 1162.

Figures 14A, 14B:
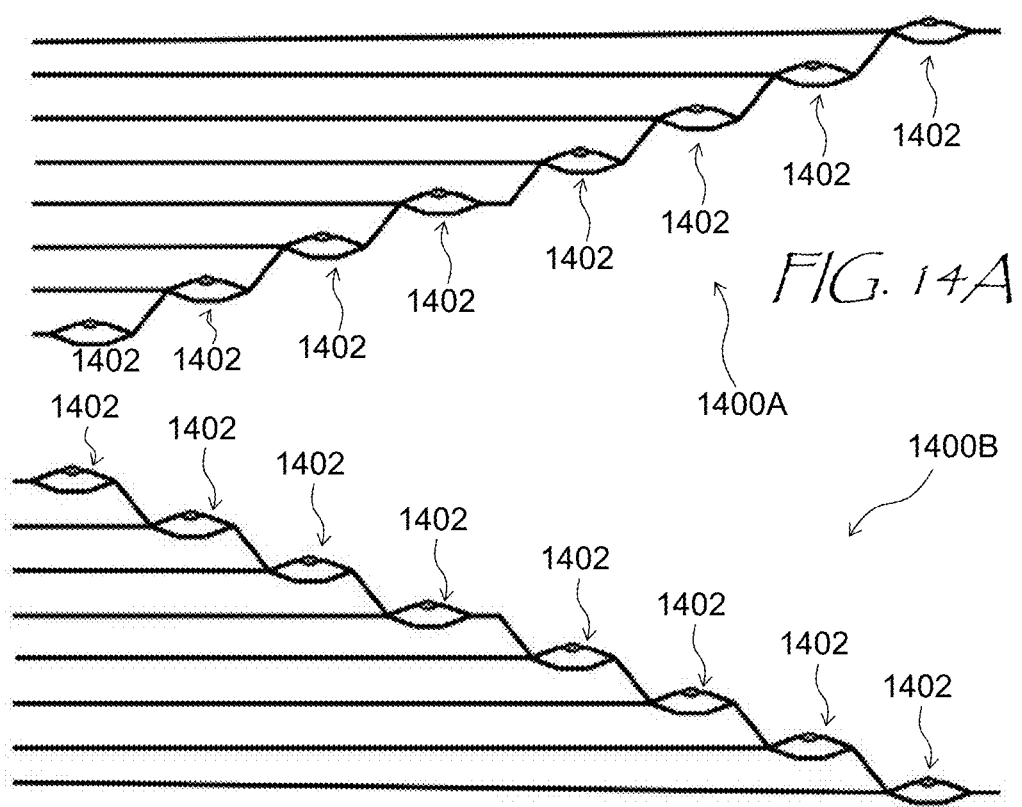
FIGS. 14A and 14B are schematic diagrams of alternative embodiments of the n×1 combiner.

Referring to FIGS. 13A and 13B, alternative embodiments 1300A, 1300B of the 1×n tunable optical splitter can include n splitter MZ interferometers 1302 in an asymmetric tree structure. In this manner, any number of inputs, e.g. n≥3, can be implemented. Similarly, alternative embodiments 1400A, 1400B of the n×1 tunable optical combiner shown in FIGS. 14A and 14B, respectively, can include n combiner MZ interferometers 1402 in an asymmetric tree structure. Symmetrical binary tree MZ structures shown in FIG. 11 can also be used, e.g. for n≥4. Symmetrical binary tree MZ structures generally require less MZ interferometers than an asymmetric binary tree structures with the same number of outputs.

Figure 15:
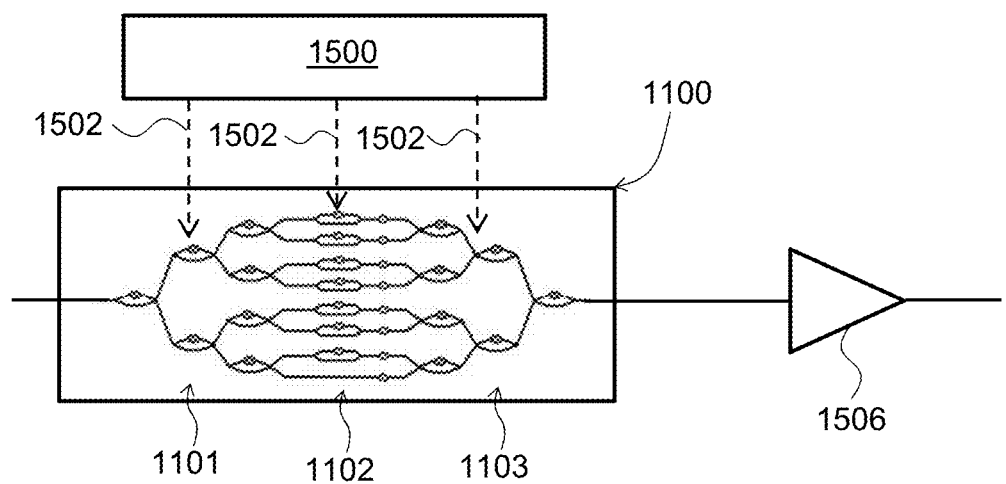
FIG. 15 is a schematic diagram of the variable optical filter of FIG. 11 including a controller, the variable optical filter being coupled to an optical gain medium.

Referring to FIG. 15, the tunable optical filter 1100A can include a controller 1500 operably coupled, e.g. by control lines 1502, to the tunable optical splitter 1101 to control the power-splitting of the input optical signal between the n output waveguides, to each phase adjuster of the MZ interferometers 1102 to tune optical transmission of the MZ interferometers 1102 to adjust optical path length difference in each MZ interferometer 1102, and to the tunable optical combiner 1103 to control the power-combining of the split optical signals into the output optical signal. A similar configuration may also be provided for the reflective tunable optical filter variant 1100B.

Figure 16A:
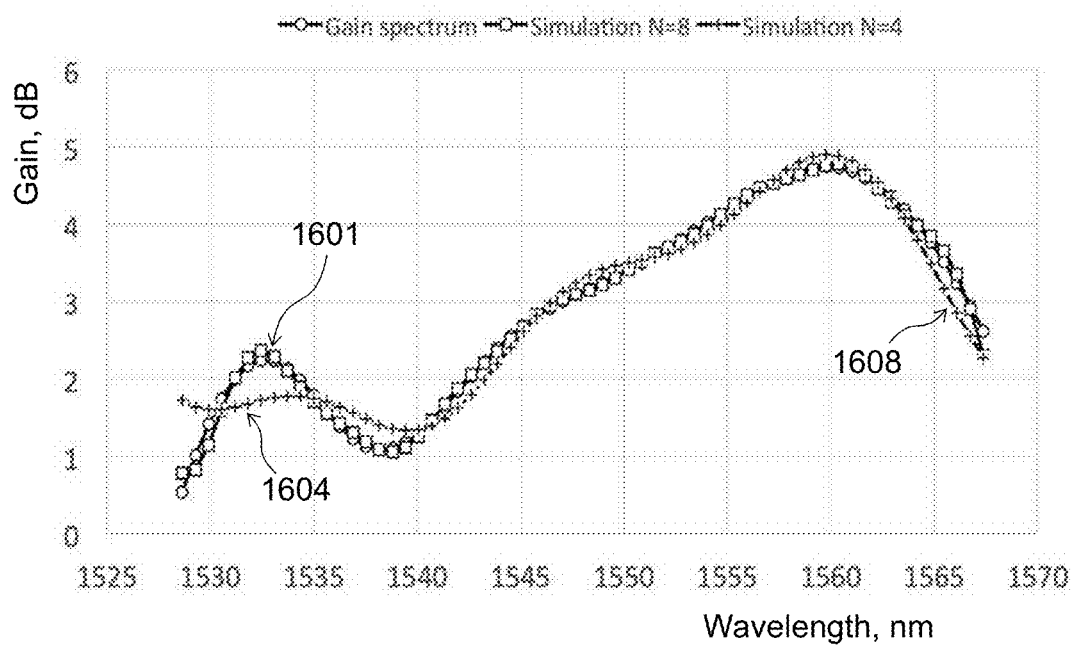
FIG. 16A is a spectral gain profile of an erbium doped fiber amplifier (EDFA) gain medium and a pair od transmission spectral plots of the variable optical filter of FIG. ii matching the EDFA spectral gain profile.

Still referring to FIG. 15, an optical gain medium 1506 is coupled to the variable optical filter 1100A. The controller 1500 may be configured to adjust any of the power-splitting, power-combining, and optical path length difference of the MZ interferometers 1102 so as to lessen a variation of a spectral characteristic of the optical gain medium 1506. To illustrate this point, an EDFA gain medium gain profile 1601 is illustrated in FIG. 16A. The controller 1500 can control the tunable optical filter 1100A to provide an optical attenuation spectrum 1604 for n=4 and an optical attenuation spectrum 1608 for n=8, thereby flattening the gain profile 1601.

Figure 16B:
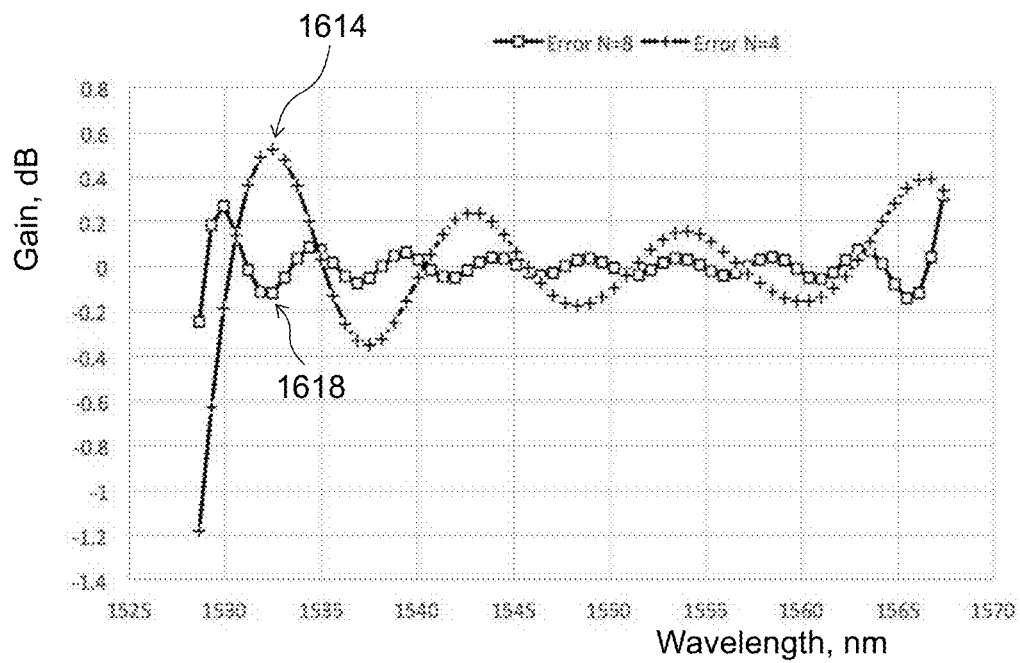
FIG. 16B is a flattened gain profile of the EDFA of FIG. 13A.
Figure 17:
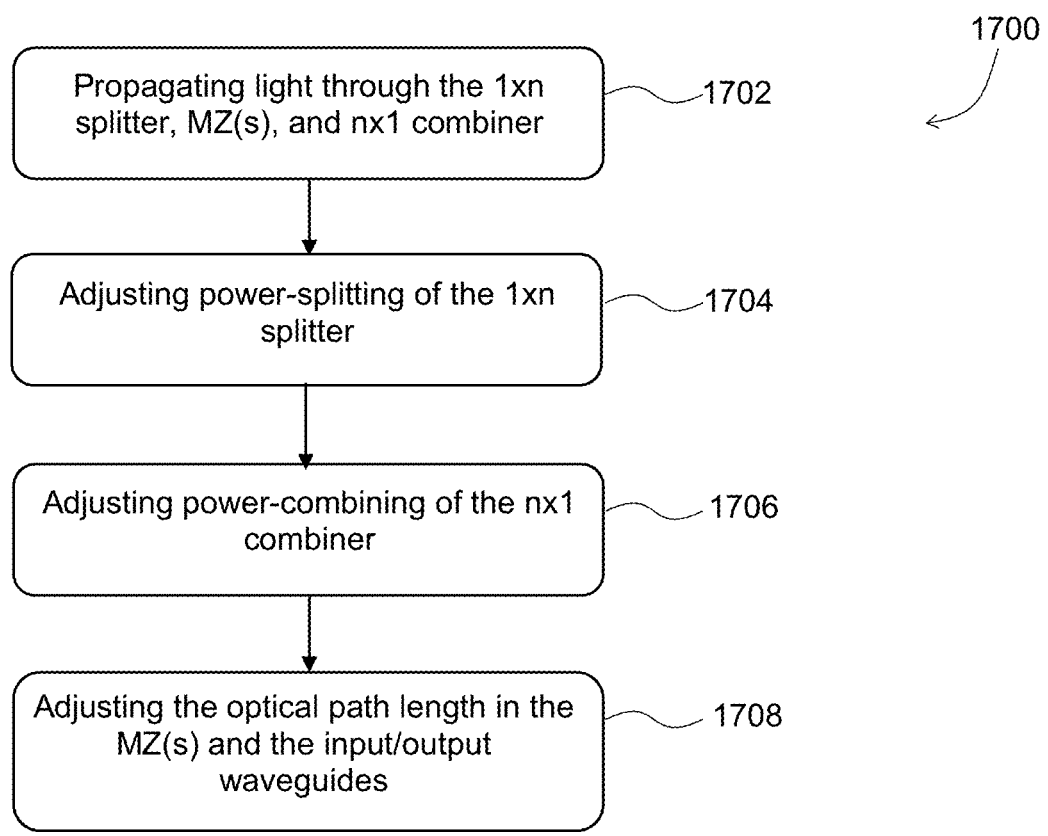
FIG. 17 is a flow chart of a method for varying a spectral characteristic of light according to the disclosure.

Resulting flattened gain profiles 1614, 1618 are shown in FIG. 16B. It can be concluded that increasing the parameter n, that is, number of split paths, can provide a better flattening of the gain profile 1601. Turning to FIG. 17, a method 1700 for varying a spectral characteristic of light includes a step 1702 of sequentially propagating the light through the tunable optical splitter 1101 comprising the input waveguide 1111 and n output waveguides 1112, at least one MZ interferometer 1102 optically coupled to an output waveguide of the n output waveguides 1112 of the tunable optical splitter 1101, and the tunable optical combiner 1103 comprising n input waveguides 1113 and the output waveguide 1114 and optically coupled by one of the n input waveguides 1113 to the at least one MZ interferometer 1102. In step 1704, power-splitting of the light between the n output waveguides 1112 of the tunable optical splitter 1102 is adjusted, thereby varying the spectral characteristic of the light as explained above. The power-combining of the light split between the n output waveguides 1112 may also be adjusted in step 1706 so as to couple the light into the output waveguide 1114 of the tunable optical combiner 1103. The optical phase of the light in the at least one MZ interferometer and in each one of the n output waveguides, or in each one of the n input waveguides, may also be adjusted in step 1708 so as to improve efficiency of coupling of the light into the output waveguide of the tunable optical combiner. Steps 102 to 1708 may be performed sequentially in any order, or simultaneously. Optionally, a spectral gain variation, e.g. a spectral tilt, caused by a change of an overall gain setting introduced e.g. by the VOA 840 in the optical amplifier 800 (FIG. 8A), may also be lessened as explained above.

The above described embodiments and methods, and applications thereof, are meant to be illustrative and not limiting. For example, a tunable optical filter of the present disclosure may be used for adjusting gain tilt, or for adjusting another gain parameter of a variety of optical amplifiers including different gain media. The optical gain profile change may be caused not only by temperature, but by other conditions and parameters, e.g. amplifier load, operational mode, pump power, aging, etc. The waveguide interferometers of the variable optical filter described herein may be constructed using different material systems, including silicon, silicon oxide, silicon nitride, polymer waveguides, etc.

What is claimed is:

1. A variable optical filter comprising:
   a tunable optical splitter comprising an input waveguide and n output waveguides, for controllable power-splitting of an input optical signal between the n output waveguides, wherein n is an integer ≥2;
   a tunable optical combiner comprising n input waveguides and an output waveguide, for controllable power-combining of split optical signals at the n input waveguides of the tunable optical combiner into an output optical signal in the output waveguide of the tunable optical combiner; and
   at least one Mach-Zehnder (MZ) interferometer optically coupled between an output waveguide of the n output waveguides of the tunable optical splitter and an input waveguide of the n input waveguides of the tunable optical combiner, wherein the at least one MZ interferometer comprises a pair of path waveguides having different optical path lengths, wherein the tunable optical splitter and the tunable optical combiner comprise a same double-pass 1×n optical coupler, wherein the at least one MZ interferometer is optically coupled to the double-pass 1×n optical coupler and further comprises a mirror for reflecting light propagating in the path waveguides to propagate back through the same respective path waveguides;
   the variable optical filter further comprising an optical circulator or a directional coupler optically coupled to the double-pass 1×n optical coupler for separating input light coupled to the double-pass 1×n optical coupler and output light coupled from the double-pass 1×n optical coupler.

2. The variable optical filter of claim 1, wherein n and wherein the at least one MZ interferometer comprises n−1 MZ interferometers.

3. The variable optical filter of claim 1, wherein each one of the n−1 MZ interferometers has a free spectral range (FSR), wherein the FSRs of the n−1 MZ interferometers are in a binary relationship with respect to each other.

4. The variable optical filter of claim 1, wherein the at least one MZ interferometer further comprises a phase adjuster coupled to at least one of the path waveguides of the at least one MZ interferometer for adjusting an optical path length difference between the path waveguides of the MZ interferometer.

5. The variable optical filter of claim 1, wherein n≥4, the at least one MZ interferometer comprises n−1 MZ interferometers, and the splitter MZ interferometers or the combiner MZ interferometers comprise a symmetrical binary tree structure; or
   wherein n≥3, the at least one MZ interferometer comprises n−1 MZ interferometers, and the splitter MZ interferometers or the combiner MZ interferometers comprise an asymmetric tree structure.

* * * * *